S. N. SPRINGER.
BALING WIRE TIER.
APPLICATION FILED SEPT. 13, 1917.
1,278,051.
Patented Sept. 3, 1918.
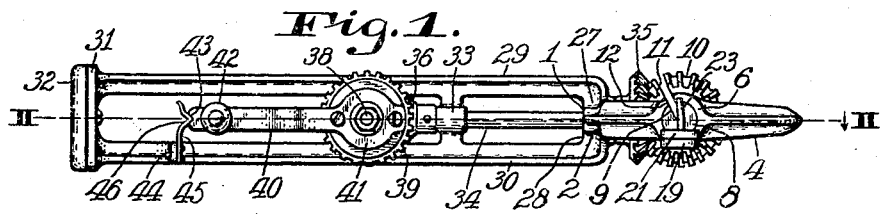
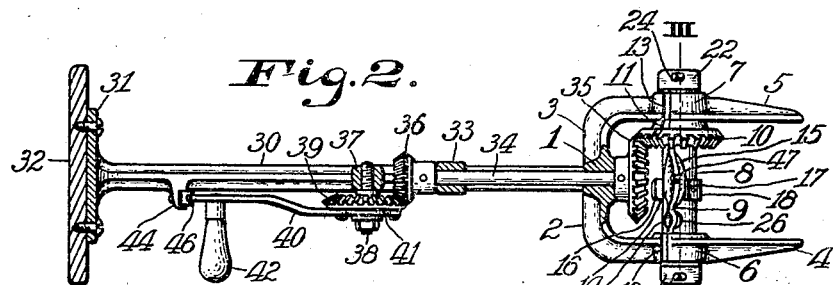
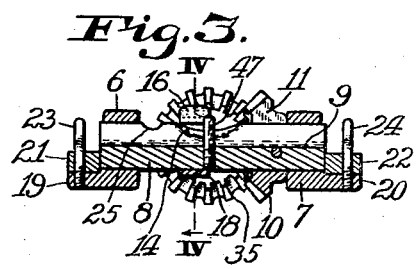 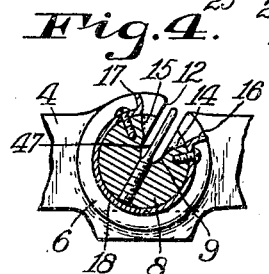 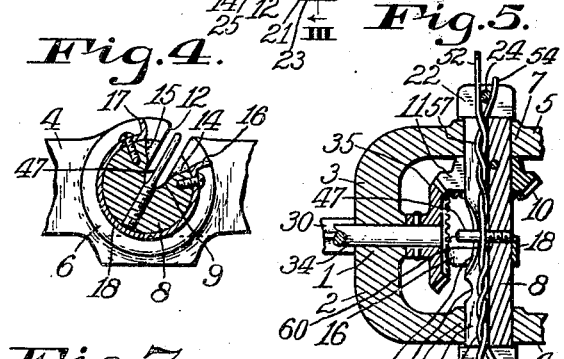
 
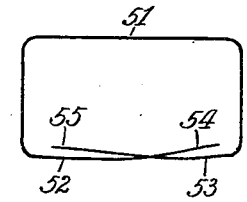 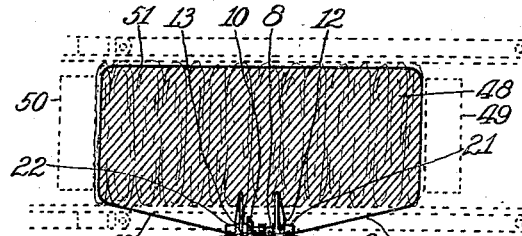
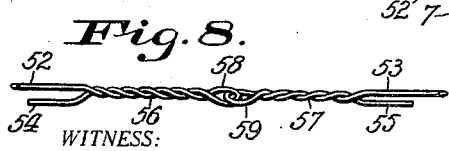 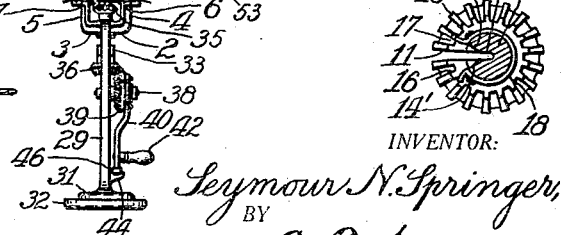
WITNESS:
J. H. Gardner
J. C. Waskom
INVENTOR:
Seymour N. Springer,
BY
E. D. Silvius,
ATTORNEY.

UNITED STATES PATENT OFFICE.

SEYMOUR NEWTON SPRINGER, OF WARREN TOWNSHIP, MARION COUNTY, INDIANA.

BALING-WIRE TIER.

1,278,051.　　　　　Specification of Letters Patent.　　Patented Sept. 3, 1918.

Application filed September 13, 1917.　Serial No. 191,206.

*To all whom it may concern:*

Be it known that I, SEYMOUR NEWTON SPRINGER, a citizen of the United States, residing in Warren township, in the county of Marion and State of Indiana, have invented a new and useful Baling-Wire Tier, of which the following is a specification, reference being had to the accompanying drawings and to the letters and figures of reference marked thereon.

This invention relates to a portable machine that is designed to be operated at a baling press for making bale ties or bands on bales of hay or other substance in the baling press, the invention having reference more particularly to a machine that is designed for twisting the end portions of a baling wire to form a baling band or tie.

An object of the invention is to provide a simple and inexpensive machine whereby bale ties may be cheaply produced from stock wire and immediately used as required in baling operations.

Another object is to provide means whereby baling wires may be expeditiously and reliably tied to form bands on bales without necessitating the expense and trouble entailed by the purchase and handling of factory-made bale ties.

A further object is to provide means whereby a strong and reliable bale tie or band may be economically produced, in order to avoid the necessity of using the bale tie hitherto in common use which has a machine-made loop on one end and requires that the opposite end of the tie wire be connected crudely by hand to the loop, with the result that the hand-made connection proves faulty because of loosely twisted portions that slip under the strains imposed and finally results in the breaking of the connection.

With the above-mentioned and other objects in view, the invention consists in a portable machine having means for twisting or wrapping portions of baling wire together to produce a bale tie or band; and, the invention consists also further in the novel parts and combinations and arrangements of parts as hereinafter particularly described and further defined in the accompanying claims.

Referring to the drawings,—Figure 1 is a side elevation of the baling wire tier as preferably constructed; Fig. 2 is a sectional plan approximately on the line II—II on Fig. 1; Fig. 3 is a section on the line III—III on Fig. 2, but showing the movable parts in relatively different positions; Fig. 4 is a fragmentary section on the line IV—IV on Fig. 3; Fig. 5 is a fragmentary section on the line II—II on Fig. 1 but with the movable parts in different positions and with which a baling wire is shown in tied condition; Fig. 6 is a plan of a baling band partially completed; Fig. 7 is a horizontal section of a bale being formed in a baling press and a tie or band for the bale being produced by the baling wire tier arranged in operative position; Fig. 8 illustrates a specimen of the loops whereby the end portions of the baling wire is connected by means of the baling wire tier; and, Fig. 9 is a section of a novel twister spindle embraced in the improved machine, slightly modified.

Similar reference characters on the different figures of the drawings indicate like parts or features of construction herein referred to.

In practically carrying out the objects of the invention, a rotary twister is provided which is mounted in a suitable portable frame or stock and provided with suitable power operating means which preferably comprise hand power devices. A suitable frame comprises a head having a journal box 1 from which two arms 2 and 3 extend, two frame members or arm portions 4 and 5 extending from the arms 2 and 3 respectively, the members being in parallel arrangement and having bluntly pointed ends. The members 4 and 5 have suitable spindle bearings 6 and 7 respectively in which a cylindrical twister spindle 8 is rotatably mounted. The spindle has a channel 9 in its side that extends longitudinally from end to end of the spindle. The spindle has its bearings adjacent to its ends, and a toothed gear wheel 10 is secured to the spindle adjacent to the inner side of one of the spindle bearings, the gear wheel having a gap 11 therein between two of its teeth, the gap extending to the channel 9 to permit the baling wires to be laterally moved into or out of the channel through slots 12 and 13 which are made in the walls of the normal upper sides of the spindle bearings 6 and 7 respectively, suitable provision being made for placing and holding the channel in position at the slots. The opposite walls of the channel 9 have recesses or flaring guide faces 14 and 15 respectively and preferably the spindle is provided with two guide projections 16 and 17 extending outwardly from the guide faces so as to guide hand formed loops into the channel. In order that the projections shall not prevent the passage of the spindle through the spindle bearings the projections 16 and 17 are formed on a collar 18 embracing the spindle and removably secured thereto. The normal lower portions of the members 4 and 5 have lateral projections 19 and 20 thereon respectively that permit the spindle to be inserted endwise into its bearings. Preferably the projections have guide plates or blocks 21 and 22 thereon through which posts 23 and 24 extend, the posts being removably secured to the projections and retaining the plates in place, the guide plate being useful in preventing the baling wires from falling down in the channel 9 as the spindle is rotated and carries the mouth of the channel downward. The spindle 8 preferably has recesses 25 and 26 at opposite sides of the channel to receive the fingers of the operator while pushing the baling wires down into the channel. The gear wheel 10 is provided with suitable driving means, and preferably the wheel 10 is beveled.

A suitable handle portion of the frame or stock comprises arms 27 and 28 that are integral with the journal box 1 and extend radially at right angles to the arms 2 and 3, two bars 29 and 30 being integral with the arms 27 and 28 respectively and extending in parallel arrangement each to the other so as to provide a foundation for driving gears, a suitable breast plate 31 being integral with the bars and preferably having a face plate 32 of wood or other material secured thereto. The handle bars support a journal box 33 between them in which a shaft 34 is journaled, the shaft being journaled also in the journal box portion 1 of the forked head. The shaft extends through the journal boxes and on one end portion a bevel gear wheel 35 is secured that meshes with the wheel 10, a bevel pinion 36 being secured to the opposite end portion of the shaft. A cross bar 37 is supported by the bars 29 and 30 and supports a stub axle 38 on which a bevel toothed driving wheel 39 is rotatably mounted and provided with a crank arm 40, the latter preferably having a base plate 41 which is secured to the wheel, the arm having a handle 42. The dimensions of the driving wheel 39 and the pinion 36 relatively to each other are such as to bring the channel of the twister spindle to the slots in the spindle bearings when the crank arm is stopped at one position relatively to the handle portion of the machine, the diameter of the pinion preferably being one-half that of the driving wheel. A suitable latch for the crank arm is provided, the end of the arm preferably having a V-shaped notch 43 therein for the purpose. The bar 30 has a projection 44 thereon to which a spring-plate 45 is secured which has a V-shaped catch portion 46 to be thrust into the notch 43 when the crank arm is stopped in the required position.

In order to enable the machine to twist the end portions of a baling wire together if desired without requiring hand-made connected loops to be first made, the twister spindle 8 preferably is provided with a spur 47 which is secured to the spindle and arranged in the channel 9 so as to extend transversely from the bottom of the channel, for causing the wire portions to be twisted on rotation of the spindle, and in such case the recesses 14 and 15 should be sufficiently deep to extend nearly to the bottom of the channel and afford clearance for the operator's fingers while pushing the wires into the channel; but the recesses may be less in depth measured from the periphery of the spindle, and the walls of the channel made more flaring in case it is desired to form loops on the wire portions, so that the loops may readily be received into the channel and be prevented from turning over therein in the absence of the spur, it being permissible to omit the spur when the wires are connected by means of loops, but in case the loops are to be made the spur will be advantageous. If the spur be omitted, as in Fig. 9, the recesses 14' and 15' may be in the opposite walls of the channel, leaving sufficient wall face near the bottom of the channel to prevent loops from turning over in the channel.

In practical use hay or other substance is packed in a baling chamber (indicated by broken lines) so as to form a bale 48 between division blocks 49 and 50, the arrangement being indicated in Fig. 7. Baling wire arranged on spools or in coils is readily obtained and the wire is cut off into suitable lengths as required for each bale without waste of wire. The wire is drawn out from the spool or coil and passed around the bale in the baling chamber so as to form an incomplete band 51, after which the proper length of wire may be cut off from the stock wire, leaving tie portions 52 and 53 which are brought together and crossed, as in Fig. 6, or may be bent over to form connected hooks of the end portions 54 and 55, this being properly done while the baled substance is under compression. Immediately the wire tier is placed in position horizontally with the ends of the members 4 and 5 pushed into the substance of the bale, after which the operator rests the breast plate 31 against his body to enable him to hold the machine in place, after which the connected wire portions are drawn forward and placed in the channel of the twister spindle, the main portions of the wire being brought forward of the posts 23 and 24 as shown in Fig. 5, the shorter hook or end portions being placed on the opposite side of the posts. In case the spindle is provided with the spur 47 the two wire portions, when no loops are formed, are placed on opposite sides respectively of the spur which is required to cause twisting of the wires; and if loops are first formed by hand, one loop is placed on the spur. Immediately the crank arm 40 is released from the spring-catch 46 and operated so as to move the driving gear wheel 39 two revolutions, which causes the twister spindle to turn four revolutions and twist the hook or tie portions and produce closely twisted cable portions 56 and 57 having symmetrical loops 58 and 59 thereon that are inseparably connected together when loops are desired, or a single loop 60 may be formed as seen in Fig. 5, the cable portions being so firm as to prevent relative slippage or parting of the different portions of the wire. The band or tie having been completed the machine is disconnected therefrom and is ready for immediate use to tie another wire.

Having thus described the invention, what is claimed as new is—

1. A baling wire tier including a frame provided with arm portions having slotted spindle bearings and also a post adjacent to the outside of each of the bearings, the arm portion having points for holding the arm portions in place on a bale, a twister spindle rotatable in the bearings and between the posts, the spindle having a channel extending longitudinally from end to end thereof and also a spur secured in the bottom of the channel, and means for rotating the spindle.

2. A baling wire tier including a forked frame having a handle, the opposite sides of the frame having each a post supported on the outer side thereof, a channeled twister spindle rotatably mounted in the frame between the posts, a driving wheel rotatably mounted on the handle of the frame and having a crank arm thereon, gearing operatively connecting the twister spindle with the driving wheel, and means for latching the crank arm in one position to the handle of the frame.

3. A baling wire tier including a frame comprising a pointed holding fork and a handle, a channeled twister spindle rotatably mounted in the fork, a beveled twister gear wheel secured to the spindle and having a gap therein extending to the channel of the spindle, a shaft rotatably mounted in the handle, a beveled driving gear wheel rotatably mounted on the handle and provided with a crank arm, a beveled gear wheel secured to the shaft and meshing with the twister gear wheel, and a beveled pinion secured to the shaft and meshing with the driving gear wheel.

4. A baling wire tier including a portable frame comprising two members having each a journal box and a post adjacent to the outer side of the box, the members being pointed to hold them in place on a bale, one side of each box having a slot therein, a twister spindle rotatably mounted in the journal boxes and having a channel in one side thereof extending longitudinally from end to end of the spindle, a spur secured in the bottom of the channel, a twister gear wheel secured to the spindle and having a gap therein extending to the channel of the spindle, a driving shaft rotatably connected with the frame, and a gear wheel secured to the shaft in mesh with the twister gear wheel.

5. A baling wire tier comprising a handle member, a head on one end of the member having two frame members thereon, each frame member having a spindle bearing and also a pointed end portion, the normal upper portion of each spindle bearing having a slot therein, the lower portion of each frame member having a lateral projection thereon provided with a post standing opposite to the outer side of the spindle bearing, a cylindrical twister spindle rotatably supported at its ends in the spindle bearings of the frame members, the spindle having a channel in one side thereof extending longitudinally from end to end of the spindle, a twister gear wheel secured to the spindle adjacent to one of the spindle bearings and having a gap therein extending to the channel of the spindle, a bearing plate on the opposite end of the handle member, a driving wheel rotatably mounted on the handle member, gearing connected with the twister gear wheel and the driving gear wheel, a crank arm fixedly connected to the driving gear wheel, and means for latching the arm in one position to the handle member.

6. In a baling wire tier, the combination of a cylindrical twister spindle having a channel in its side extending longitudinally from end to end of the spindle, the side walls of the channel intermediately of their ends having flaring guide faces, the spindle having also a plurality of recesses on opposite sides of the channel, with a frame having slotted bearings rotatably supporting the spindle adjacent to its ends, the frame having points to engage a bale for holding the frame in place and means for rotating the spindle.

7. In a baling wire tier, the combination of a cylindrical twister spindle having a channel in its side extending longitudinally from end to end of the spindle, the side walls of the channel intermediately of their ends having flaring guide faces, the spindle having also two guide projections on opposite sides respectively of the channel and extending outward flaringly from the guide faces, with a frame rotatably supporting the spindle adjacent to its ends, and means for rotating the spindle.

8. In a baling wire tier, the combination of a fork-shaped head having a twister spindle rotatably mounted therein and adapted to twist wires together, the head being provided with devices for holding wires to be twisted by the spindle, a handle member integral with the head and having a spring-catch thereon, a driving wheel rotatably mounted on the handle member and having a crank arm thereon adapted to engage the spring-catch, and gearing connecting the twister spindle with the driving wheel.

9. In a baling wire tier, the combination of a head having two frame members thereon, each member having a spindle bearing, the normal upper portion of each bearing having a slot therein, the lower portion of each member having a lateral projection thereon, a cylindrical twister spindle rotatably supported in the spindle bearings of the frame members, the spindle having a channel in its side extending from end to end of the spindle, a handle on said head, two guide plates on said projections respectively, two posts secured to said projections respectively and extending through the adjacent guide plate, and operating gearing for the spindle coöperating with the handle and said head.

In testimony whereof I affix my signature in presence of two witnesses.

SEYMOUR NEWTON SPRINGER.

Witnesses:
OMER E. WHITEMAN,
E. T. SILVIUS.

Copies of this patent may be obtained for five cents each, by addressing the "Commissioner of Patents, Washington, D. C."